Feb. 24, 1953    R. B. ANDERSON ET AL    2,629,728
IRON NITRIDE CATALYSTS IN CARBON OXIDE HYDROGENATIONS
Filed Aug. 22, 1949    2 SHEETS—SHEET 1

INVENTORS
Robert B. Anderson
John F. Shultz
BY
ATTORNEY

Feb. 24, 1953 R. B. ANDERSON ET AL 2,629,728
IRON NITRIDE CATALYSTS IN CARBON OXIDE HYDROGENATIONS
Filed Aug. 22, 1949

INVENTORS
Robert B. Anderson
John F. Shultz
BY
ATTORNEY

Patented Feb. 24, 1953

2,629,728

UNITED STATES PATENT OFFICE 2,629,728

IRON NITRIDE CATALYSTS IN CARBON OXIDE HYDROGENATIONS

Robert B. Anderson and John F. Shultz, Pittsburgh, Pa., assignors to the United States of America as represented by the Secretary of the Interior Application August 22, 1949, Serial No. 111,755

15 Claims. (Cl. 260—449.6)

(Granted under Title 35, U. S. Code (1952), sec. 266)

The invention herein described and claimed may be manufactured and used by or for the Government of the United States of America for governmental purposes without the payment of royalties thereon or therefor.

This invention relates to a process for catalytically hydrogenating oxides of carbon especially carbon monoxide. More particularly the invention relates to an improvement in this process wherein the process is carried out in the presence of an improved iron catalyst.

In commercial scale processes involving the catalytic hydrogenation of carbon oxides, such as the Fischer-Tropsch and related processes, one of the major elements of cost has been the catalyst. To obtain appreciable quantities of product, the use of large amounts of catalyst is necessary. Since the catalyst must be prepared by exacting techniques from carefully purified materials, the development of a highly active, durable catalyst which possesses a high degree of versatility in producing a wide variety of products is of the utmost importance for the commercial success of the process.

High activity is important because yield of product per unit of time, per unit volume of catalyst, that is, the space-time yield, is in direct proportion to the activity of the catalyst employed. Higher yields of product for a smaller volume of catalyst, that is, more rapid conversion of the synthesis gas, of course, decreases the volume of catalyst necessary to produce the same amount of product in the same period of time. This also results in a decrease in the amount of equipment, such as the number of reactor tubes, necessary.

Durability of the catalyst is an obvious desideratum. As heretofore mentioned, the catalyst itself is quite inexpensive to prepare and also expensive to regenerate once it has lost its activity. Furthermore, in fixed-bed catalyst operations and in any type of operation wherein the catalyst is not continuously withdrawn and renewed, when the catalyst has lost its activity, it must be removed and replaced by new catalyst. This necessitates a shut-down in operations tying up expensive equipment and calling for the expenditure of labor and time to start operation again. Iron catalysts have been extensively used in catalytic hydrogenation of carbon oxides because they are less expensive and more available than other commonly used catalysts such as cobalt or nickel. However, iron catalysts have been found to deteriorate in use, for a number of reasons. One reason is the deposition of free carbon and other carbonaceous material within the catalyst pores causing the expansion and mechanical disintegration of the catalyst. In fixed-bed operations, the disintegration of the catalyst eventually plugs the catalyst bed and blocks the passage of the synthesis gases. In the so-called fluidized catalyst operation, expansion and disintegration of the catalyst causes a decrease in density of the bed as a whole which in turn causes the catalyst particles to become entrained in the synthesis gas stream and to be carried out of the reactor. Particularly in fluidized bed operation, deposition of wax on the catalyst particles causes the particles to agglomerate. In a fluidized bed, agglomerization of the catalyst particles renders the bed non-fluid. A catalyst that produced less wax would be relatively free from this difficulty. Finally, it appears that processes contributing to catalyst deterioration, particularly carbon deposition, are accelerated as the amount of oxygen in the catalyst increases. Thus, a catalyst which will resist oxidation during use is to be desired.

As pointed out above, it is desirable that the catalyst be highly active and durable. A third desideratum for the catalyst is versatility. In the Fischer-Tropsch and related process, a wide variety of products are obtainable depending on the catalyst employed. High and low molecular weight hydrocarbons, saturated and unsaturated, high and low molecular weight oxygenated organic compounds such as alcohols, aldehydes, and acids are typical products. The distribution of these products in the total product yield depends largely on the type of catalyst employed. A catalyst, that may be simply and quickly treated to shift the distribution of the products in a predetermined direction, is to be desired.

It is an object of the invention to improve the process for catalytically hydrogenating carbon oxides, and in particular carbon monoxide, by providing an improved iron catalyst therefor.

It is a further object of the invention to improve the above mentioned process by providing an iron catalyst which is highly active and durable and which will retain its high activity for long periods of time.

A further object of the invention is to improve the process for the catalytic hydrogenation of carbon monoxide by providing a catalyst for use in this process which may be easily treated to alter the distribution of the products in the desired direction, and which in particular permits the production of heavy waxes to be reduced to a minimum if desired.

Other objects of the invention will become apparent from consideration of the detailed description below read in connection with the accompanying drawings.

Previously, iron catalysts designed for use in the catalytic hydrogenation of carbon oxides have been subjected to various pretreatments in order to improve their properties. One customary pretreatment of the catalyst is to reduce the iron oxide in the catalyst to metallic iron in hydrogen. Another common pretreatment is to subject the iron catalyst in the reduced or oxidized state to a stream of carbon monoxide, or to a stream of a mixture of carbon monoxide and hydrogen, prior to use in the process. This treatment appears to enhance the initial activity of the catalyst by forming interstitial carbides, although the exact manner in which the activity is improved has not been finally determined.

We have now found that the process of catalytically hydrogenating carbon oxides and in particular carbon monoxide can be very materially improved by carrying out the process in the presence of an iron catalyst which contains an appreciable amount of an iron nitride. An iron nitride is a chemical compound of nitrogen and iron which will be described in more detail below.

In the detailed description that follows, the invention will be better understood by reference to the following drawings in which.

PREPARATION OF THE NITRIDED IRON CATALYST

The nitrides of iron are known and have been fairly thoroughly studied. The following phases in the system for various atom ratios of nitrogen to iron have been found:

| Type of nitride present | Atom Ratio N:Fe | Arrangement of iron atoms |
| --- | --- | --- |
| No nitride present. Some nitrogen dissolved in α iron. | <0.008 | Body centered cubic. |
| α iron coexists with Fe$_4$N | 0.008–0.242 |  |
| Fe$_4$N | 0.242–0.260 | Face-centered cubic. |
| Fe$_4$N coexists with Fe$_3$N | 0.260–0.317 |  |
| Continuous series of homogeneous solid solutions of N and Fe with Fe$_2$N as upper limit and Fe$_3$N as lower limit. | 0.317–0.500 | Close packed hexagonal. |
| Relatively unstable phase | 0.500–0.51 | Orthorhombic. |

It appears to be impossible to obtain nitrides in which the atom ratio of N:Fe is greater than 0.510.

It has been found that iron nitrides cannot be formed by action of molecular nitrogen. At 450° C. the dissociation pressure of the phase corresponding approximately to Fe$_4$N is approximately 5,000 atmospheres; and the dissociation pressure of the phase Fe$_3$N at 450° C. is about 300,000 atmospheres. In order to form the nitrided iron catalysts of the present invention, the most practical method has been found to be the treatment of the reduced iron catalyst in a relatively rapid stream of ammonia gas at elevated temperatures. The reaction of ammonia with iron to form two typical nitrides is expressed in the following equations:

1. $8Fe + 2NH_3 \rightleftharpoons 2Fe_4N + 3H_2$
2. $6Fe_4N + 2NH_3 \rightleftharpoons 8Fe_3N + 3H_2$ Since the above reactions are reversible, it will be apparent from the laws of chemical equilibrium that the formation of the nitride is dependent upon the ratio of the concentration of $NH_3:H_2$ at the surface of the iron. Expressed otherwise, the formation of the nitride depends upon the ratio of the square of the partial pressure of ammonia to the cube of the partial pressure of hydrogen ($p_{NH_3}^2 / p_{H_2}^3$). For any given temperature, there will be a ratio of concentration of ammonia to hydrogen below which it is thermodynamically impossible for either or both of reactions 1 or 2 to proceed at all. For example, in Table A, the lowest molecular concentration (in percent) of ammonia in a mixture of hydrogen and ammonia is given (for various temperatures) at which it is thermodynamically possible to form the indicated iron nitride.

Table A

| Temp., °C. | Type of nitride | Molecular concentration (in percent) of NH$_3$ necessary |
| --- | --- | --- |
| 300 | Fe$_4$N | 55 |
| 300 | Fe$_3$N | (approx.) 95 |
| 400 | Fe$_4$N | 37 |
| 400 | Fe$_3$N | 77 |
| 525 | Fe$_4$N | 17 |
| 525 | Fe$_3$N | 53 |
| 575 | Fe$_4$N | 14.5 |
| 575 | Fe$_3$N | 45 |

It can be seen from the above table that the concentration of ammonia in a NH$_3$, H$_2$ mixture, necessary to form a given nitride decreases with increase in temperature. It is also a fact that increasing temperature tends to increase the rate of nitriding. In practice, however, the fact that at higher temperatures the thermodynamics and kinetics of the reaction are favored is of limited advantage. This is because at elevated temperatures beginning at approximately 300° C., the iron catalyst decomposes the ammonia gas to hydrogen and nitrogen according to the equation:

$$2NH_3 \xrightarrow[\text{Fe}]{\text{above 300° C.}} 3H_2 + N_2$$

The hydrogen formed by cracking of ammonia may either decrease the rate of nitriding or if the hydrogen to ammonia ratio becomes sufficiently large, prevent the formation of nitride entirely (Table A).

As the temperature increases the rate of decomposition of the ammonia increases rapidly until at temperatures above 550° C., it is practically impossible to obtain the concentration of ammonia thermodynamically required for the nitriding reaction to proceed at all. In other words, at temperatures above 550° C., the large amounts of H$_2$ formed by decomposition of NH$_3$ substantially prevents the formation of nitrides. Even at temperatures below 550° C., for a given catalyst, the rate of decomposition of NH$_3$, may make operation impractical, in which case a still lower temperature must be chosen. The lower temperature limit at which an iron catalyst may be successively nitrided by treatment in a stream of ammonia, appears to be about 200° C. This is about the lowest temperature at which the rate of nitriding is appreciable. Below this temperature the rate of formation of the nitride is too slow for practical operation.

When the catalyst is nitrided in ammonia gas, the temperature of nitriding is the primary factor in determining the rate of nitriding or whether nitriding will proceed at all, the practical temperature limits being between 200° C. to 550° C., as explained above. Another factor of importance in determining the nitriding rate is the velocity of the stream of ammonia gas in which the catalyst is being treated. As explained above, the course of the reaction of ammonia with metallic iron to produce iron nitride is determined by the concentration of ammonia at the catalyst surface. As the velocity of ammonia passing over the catalyst increases, the concentration of ammonia at the surface will also increase since the hydrogen formed by the reaction itself and by the cracking of ammonia gas will be carried away faster from the surface as the velocity of the gas stream passing over the catalyst increases.

A third factor in determining the rate of nitriding is the type of catalyst being nitrided. Each catalyst will have an appreciably different rate of nitriding depending among other things on its physical structure and on the type of promotors present.

The optimum temperature and rate of flow of ammonia gas for any given catalyst which will give the maximum rate of nitriding must in each case be determined empirically. A high rate of flow of ammonia gas passing over the catalyst will always increase the rate of nitriding and therefore the rate of flow of ammonia gas should always be chosen as high as practical. For this chosen rate of flow of ammonia gas there will be temperatures at which the maximum rate of nitriding is obtained for a given catalyst. Determining the optimum temperature is a matter of finding the balance between the two opposing factors discussed above, the one factor being the fact that higher temperatures both kinetically and thermodynamically favor formation of nitride, and the other factor being the fact that at higher temperatures the rate of cracking of ammonia gas is accelerated, which drives the reaction in the opposite direction. As mentioned above, increasing the flow of ammonia gas over the catalyst being nitrided will always tend to improve the rate and completeness of nitriding by increasing the concentration of ammonia at the catalyst surface. However, at temperatures above 550° C., practically speaking, it is impossible to materially improve the rate of nitriding by increasing the rate of flow of ammonia gas because above this temperature the rate of decomposition of ammonia is very fast. At temperatures below about 200° C. although the rate of decomposition of ammonia in the presence of iron is practically negligible, the rate of formation of the nitride is extremely slow.

In order to obtain the required concentration of ammonia at the catalyst surface at temperatures between 200° and 550° C., a gas containing substantially 100% ammonia gas must be used. The presence of inert gases in the ammonia in relatively small amounts is not serious but requires an increased rate of flow of the gas stream in order to obtain equivalent concentrations of ammonia at the catalyst surface. However, adulteration of the ammonia gas with any appreciable amounts of hydrogen renders the formation of the nitride virtually impossible.

The following examples illustrate the production of nitrided iron catalysts in accordance with the present invention.

EXAMPLE A

One type of iron catalyst which has been found to be particularly useful in the catalytic hydrogenation of carbon monoxide is a fused iron catalyst of the type employed in the synthesis of ammonia from $H_2$ and $N_2$. In general, these catalysts are prepared by making a physical mixture of an iron oxide and desired promoters and then fusing the mixture in an electric arc. For typical methods of preparation of synthetic ammonia catalysts see Bridger, Pole, Beinlich, and Thompson, Chem. Eng. Prog., 43, 291 (1947). In the preparation of a particular catalyst the following ingredients in finely divided form are mixed together:

| Component | Percent by weight |
| --- | --- |
| High purity magnetite ore $Fe_3O_4$ | approx. 94. |
| Chromium Oxide ($Cr_2O_3$) | approx. 0.8. |
| Magnesium Oxide (MgO) | approx. 4.6. |
| Potassium Hydroxide (KOH) | approx. 0.6. |

The above ingredients are mixed until a homogeneous physical mixture is obtained and then loaded into an iron trough the sides of which are coated with a paste of $Fe_3O_4$ to provide a refractory lining. Water-cooled electrodes are then inserted into the mixture and electric current is passed therethrough until fusion takes place. A dense mass of fused magnetite with the promoters, magnesium oxide, chromium oxide, and potassium oxide, homogeneously dispersed therein is obtained in the form of a "pig." The "pig" is removed from the trough and broken into small pieces of 6 to 8 mesh, preferably.

The iron oxide is then reduced in a stream of hydrogen at about 450° C. to 500° C., the rate of flow of hydrogen being equal to a space velocity per hour of about 1000. Space velocity per hour (hereafter abbreviated SVH) is a rate of flow equivalent to volumes of gas (recalculated to standard conditions, 0° C., 760 mm. of Hg) per volume of catalyst, per hour. The volume of the catalyst is defined as the space occupied by the catalyst in the reactor.

Following the reduction in the stream of hydrogen, the catalyst is then treated in a stream of substantially 100% pure ammonia gas at a temperature of about 350 to 385° C. from about 4 to 8 hours, the rate of flow of ammonia being equal to an SVH of about 750.

A chemical analysis of the catalyst prepared as above before reduction and nitriding showed the following composition:

| Component | Percent by weight |
| --- | --- |
| Total Fe | 66.8. |
| $SiO_2$ | 0.6. |
| $Cr_2O_3$ | 0.8. |
| MgO | 4.6. |
| $K_2O$ | 0.6. |
| Oxygen | remainder. |

Figure 1:
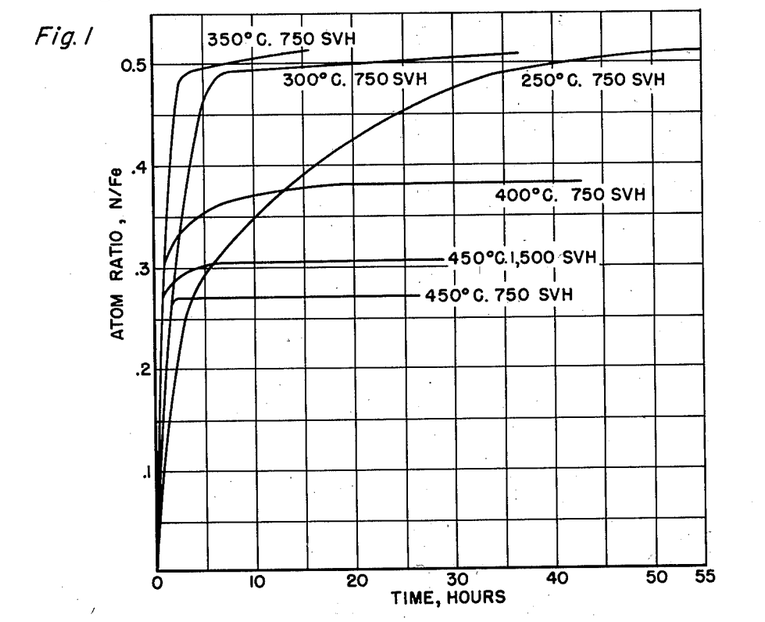
Fig. 1 is a graph illustrating the manner in which the rate of formation of iron nitride varies with temperature and rate of flow of ammonia; and, Fig. 2 is a graph illustrating how the activity of a typical iron catalyst employed in the catalytic hydrogenation of carbon monoxide varies according to whether the catalyst has been nitrided or not; and, Fig. 3 is a graph further illustrating the difference in activity between nitrided and non-nitrided catalysts; and, Fig. 4 is a graph illustrating the difference in activity between nitrided and non-nitrided iron catalysts when employed at a higher operating pressure.

As explained above the rate and completeness of nitriding varies for each given catalyst with the temperature and with the rate of flow of substantially pure ammonia gas over the catalyst. A series of tests was made employing the catalyst prepared as described above to determine the optimum conditions under which it may be nitrided in ammonia. In Fig. 1 there is graphically illustrated the results of these tests wherein the time in hours of nitriding is plotted against the atom ratio of nitrogen to iron in the catalyst. It will be noted that for the catalyst described above the optimum rate of nitriding for a flow of ammonia gas equal to an SVH of about 750 is about 350° C. At temperatures below 350° C. for instance, 300° C. or 250° C., at the same rate of flow of ammonia gas, the nitriding proceeds more slowly but the catalyst can be substantially completely nitrided, given enough time. At temperatures much above 350° C., it will be noted that the rate of nitriding is quite rapid at first, but soon levels off at a N/Fe atom ratio lower than 0.5, and proceeds no further. Thus, at 400° C. at an SVH equal to 750, the maximum atom ratio of nitrogen to iron is about 0.275. It will be noted that by doubling the space velocity of the ammonia at 450° C., the completeness of the nitriding is somewhat raised. However, even at this space velocity the maximum nitrogen to iron atom ratio obtainable is about 0.310. These data indicate that at the given flows of ammonia over the catalyst at temperatures of 400° C. and higher, it is impossible to obtain the concentrations of ammonia thermodynamically required to achieve complete nitriding of the catalyst. As will be explained below, it is not necessary to completely nitride the catalyst in order to obtain improved results although the higher nitrides will in general produce the best results.

EXAMPLE B

The preparation of another catalyst, a precipitated iron catalyst, which has been found useful in the catalytic hydrogenation of carbon monoxide is prepared by the method outlined below. Enough ferric nitrate to give a total percentage by weight of metallic iron in the final catalyst of 57.6% was dissolved in a stainless steel vessel together with enough cupric nitrate to give a final percentage of 5.8% by weight of copper in the final catalyst, in sufficient distilled water to make about a 0.56 molar solution based on the $Fe(NO_3)_3$. A 1.0 molar solution of sodium carbonate is then prepared in another vessel. The nitrate solution is preneutralized by pouring about 80% of the stoichiometric amount of sodium carbonate solution required for neutralization into the first vessel. The mixture, still at room temperature, is now heated to about 70° C., and enough more carbonate solution is added to bring down the precipitate. The resulting slurry is heated to boiling, held there for a few minutes, and then transferred to a filter press where it is washed until free of water soluble salts with hot distilled water, and finally air blown to near dryness. The filter cake is then transferred to the precipitation vessel where it is stirred into a slurry with enough 0.1 molar $K_2CO_3$ solution added with continued agitation to assure a homogeneous mixture. The slurry is then poured into trays and dried in an oven at about 105° C., after which it is broken up and screened into the desired fractions. The result is a hydrated oxide gel. Particles of this gel of from about 6 to 10 mesh are then reduced in hydrogen in the same manner described in Example A. Following reduction the catalyst is nitrided as described in Example A. A chemical analysis of the catalyst prepared as in Example B before reduction of the hydrated gel and before nitriding in ammonia shows the following composition:

| Component | Percent by weight |
|---|---|
| Total Fe | 57.6. |
| Cu | 5.8. |
| $K_2O$ | 0.3. |
| Oxygen and water | remainder. |

Nitriding of any iron catalyst which is useful in the catalytic hydrogenation of carbon oxides and in particular carbon monoxide will improve the behavior of the catalyst in the synthesis regardless of the method by which it is prepared. Thus, catalysts which have been prepared by fusion or precipitation as described above in Examples A and B, respectively, are improved by nitriding. Sintered catalysts which have been prepared by sintering mixtures of iron oxides with any desired promoters or iron catalysts prepared by any of the other methods common to the art will be improved by the nitriding treatment according to the present invention.

For many purposes, especially in the so-called fixed-bed catalyst operation, the use of a fused iron catalyst has been found to be most satisfactory, principally due to the greater resistance of this type of catalyst to mechanical deterioration in use. Nitriding of this type of catalyst appears to have a particularly great effect on its activity as will appear from the discussion below. The invention, however, is not limited to the nitrided fused iron catalyst since substantial improvement in the process of catalytically hydrogenating carbon monoxide is obtained regardless of the method of preparation of the iron catalyst employed.

It is not necessary to employ a catalyst which has been reduced to the metallic state from the oxidized state, but the use of a reduced catalyst has been found to be particularly advantageous in the catalytic hydrogenation of carbon monoxide. The reduced catalyst is probably superior because of its increased porosity caused by the removal of the oxygen from the iron oxide. The reduction may be carried out in any suitable manner but most conveniently in a stream of hydrogen at 200° to 550° C. and at a flow of hydrogen of 500 to 10,000 SVH. The reduction should be carried on for sufficient length of time so that it is virtually complete. The time required to completely reduce the catalyst will vary for any given catalyst but will generally be from about 24 to 60 hours at a flow of hydrogen of about 1000 SVH.

The inclusion of small amounts of promoters in the catalyst is often desirable. Some examples of promoters which have been found to be particularly useful in iron catalysts employed in catalytic hydrogenation of carbon monoxide are potassium oxide ($K_2O$) or sodium oxide ($Na_2O$) added, for example, in the form of the hydroxide, nitrate or carbonate and the oxides of any of the following metals: Copper, aluminum, chromium, silicon, manganese, calcium, or titanium. For any given iron catalyst, one or more of the above promoters or any of the promoters known to the art, may be included in the catalyst in order to improve its performance in a manner well known.

USE OF THE CATALYST IN THE SYNTHESIS

In the catalytic hydrogenation of carbon monoxide using the so-called fixed-bed catalyst operation, a mixture of the synthesis gases, carbon monoxide, and hydrogen, in the proper ratio is passed over the catalyst bed. Since the reaction is highly exothermic, the reactor must be designed to remove the heat of reaction in order that the catalyst bed may not become overheated. When using an iron catalyst at temperatures between 150° to 375° C. and at pressures from 0 to 400 lbs./in.²/gage, and employing ratios of carbon monoxide to hydrogen of from 3:2 to 1:2, a mixture of saturated and unsaturated hydrocarbons and oxygenated organic compounds is obtained, with the hydrocarbon fraction predominating. The heavier hydrocarbons and oxygenated organic compounds collect in a pot at the bottom of the reactor column while the lighter compounds are collected in a refrigerated trap and a charcoal trap. In the following examples, equipment was used to conduct the process substantially identical with the apparatus described in the article appearing in Ind. and Eng. Chem., vol. 39 (Dec. 1947) pp. 1548 to 1554 by Anderson et al.

As explained above, in this process the activity of the catalyst is highly important since output of product for a reactor of a given size containing a given amount of catalyst depends upon the activity of the catalyst. The activity of the catalyst is also important in that a highly active catalyst will permit operation at a lower temperature and produce the same or higher yields of product as less active catalysts at a higher operating temperature. Lower temperatures of operation are desirable for a number of reasons, one being that at lower temperatures the catalyst retains its activity for a longer period and another being that the rate of the reactions that cause catalyst deterioration is slower at lower temperatures.

EXAMPLES 1 AND 2

In these examples, the operating conditions for the process and the resulting products are tabulated below in Table I. A mixture of carbon monoxide and hydrogen in the ratio 1:1 which has been carefully purified especially from traces of sulphur, is passed over a catalyst prepared as in Example A above and reduced and nitrided to the extent indicated below in Table I. In Example 1, the catalyst is not nitrided while in Example 2, the catalyst is the same as in Example 1 (the fused iron catalyst $Fe:SiO_2:Cr_2O_3:MgO:K_2O$ prepared as described in Example A) but has been nitrided to an atom ratio of nitrogen to iron of 0.460. In order to have a proper basis for comparison between the results of operation of the process with the nitrided and non-nitrided catalyst, the operating conditions (with the exception of the temperature) in each case have been kept substantially the same. In each case, the synthesis gas, in which the ratio of $CO:H_2$ is 1:1, is passed over a fixed bed of the catalyst (of mesh size 6–8) at a pressure of 100 p. s. i. g. and a flow equivalent to an SVH of 100. In each example, the process was operated over a number of weeks. During the entire period of operation, in each example, the temperature was adjusted so that a conversion of synthesis gas corresponding to a contraction of the ingoing synthesis gas of about 65% was always maintained. When the percent contraction decreased, the temperature was raised until about 65% contraction was again obtained. The percent contraction of the synthesis gas was measured after substantially all the products, liquid and gaseous including $CO_2$ and $H_2O$ were removed leaving only residual CO and $H_2$. Thus, the percent contraction is a measure of the percent conversion of the ingoing synthesis gas to product. By keeping the percent conversion constant by adjusting the temperature during the entire run in both examples, the relative temperatures of operation is a measure of the comparative activity of the catalysts. The lower the temperature of operation required to give the same percentage contraction of the synthesis gas, when other operating conditions are the same, the higher is the activity of the catalyst. A catalyst which will convert the same amount of synthesis gas at a lower temperature of operation when all other operating conditions are the same, is clearly more active than a catalyst which requires higher temperature of operation to convert the same amount of synthesis gas to product.

*Table I*

| Example | 1 | 2 |
|---|---|---|
| Reduction of catalyst in $H_2$: | | |
| Temp., °C | 550 | 550 |
| Hours | 40 | 20 |
| SVH | 1,000 | 2,500 |
| Percent Reduction | 98.0 | 100.4 |
| Nitriding of catalyst in ammonia: | | |
| Temp., °C | | 385 |
| Hours | | 4 |
| SVH | | 5,000 |
| Atom ratio, N/Fe | 0 | 0.460 |
| Operating conditions for synthesis: | | |
| Temp., °C | 259 | 222 |
| Pressure, p. s. i. g | 100 | 100 |
| SVH | 97.3 | 98 |
| Percent contraction of synthesis gas | 63.0 | 62.4 |
| Weeks of operation during which above operating data was averaged | 2nd to 8th | 2nd to 7th. |
| Product composition in percent by weight, a overall distribution: | | |
| $CH_4$ | 16.2 | 17.8 |
| $C_3+C_4$ b | 18.1 | 22.0 |
| $C_1+C_2+C_3+C_4$ c | 45.4 | 51.2 |
| Liquids and solids | 54.6 | 48.8 |
| Distillation of liquids and solids, percent by weight: | | |
| B. P., <185° C | 31.2 | 61.9 |
| B. P., 185–352° C | 38.4 | 35.0 |
| B. P., 352–464° C | 14.4 | 3.1 |
| B. P., >464° C | 16.1 | <1 |
| Infrared analysis of fractions, percent by weight: | | |
| B. P., <185° C. { OH d | 0.59 | 9.9 |
| α-olefins e | 2.55 | 2.6 |
| β-olefins f | 6.33 | 0.9 |
| Bromine No | 0.59 | 23.0 |
| B. P., 185–352° C. { OH d | 0.07 | 1.5 |
| α-olefins e | 0.64 | 0.6 |
| β-olefins f | 3.58 | 1.0 |
| Bromine No | 28.0 | 11.0 | a Based on total weight of carbon compounds excepting $CO_2$ and lower alcohols dissolved in water fraction.
b $C_3+C_4$=total weight percent of hydrocarbons containing two and three carbon atoms per molecule.
c $C_1+C_2+C_3+C_4$=total weight percent of hydrocarbons having 1, 2, 3, and 4 carbon atoms per molecule.
d This weight percent is based on the weight percent of the hydroxyl (OH) group itself having a mole weight of 17.
e This weight percent is based on the weight percent of the radical αC=C having a mole weight of 24.
f This weight percent is based on the weight percent of the radical β C=C having a mole weight of 24. As used herein, the term β-olefins includes all doubled bonded carbon compounds except the α-olefins.

It will be noted that in Example 1, where the unnitrided catalyst was employed, the average temperature of operation was substantially higher than the temperature of operation in Example 2 where a nitrided catalyst was used in order to obtain the same percentage contraction of the synthesis gas under the same operating conditions. As can be seen, the nitrided catalyst under the same conditions operated at an average temperature of about 40° lower than the unnitrided catalyst. This marked difference in temperature of operation demonstrates the remarkable increase in activity of the catalyst obtained by nitriding.

Figure 2:
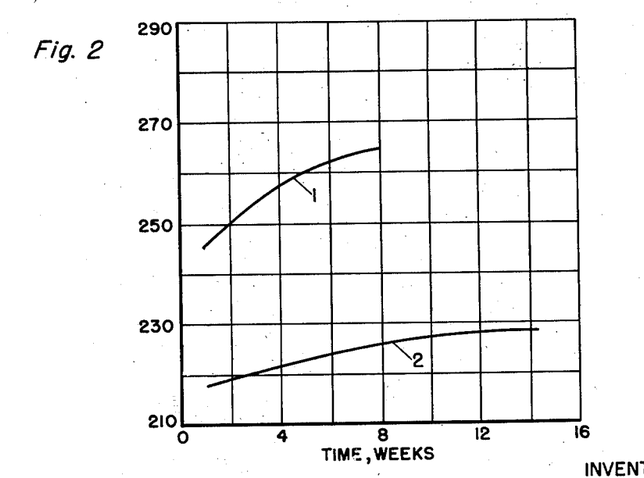

The operating temperatures listed in Table I above were averaged over a number of weeks. The graph in Fig. 2 illustrates the fact that the nitrided catalyst will not only have a lower average operating temperature to give the same space-time yield of product but will also operate at a more constant temperature. In this graph the operating temperature has been plotted against time of operation in weeks. Curve 1 illustrates the increase in operating temperature of the process conducted in accordance with Example 1 using an unnitrided catalyst, from the first to the eighth week of operation. It will be noted that in this example, the operating temperature rose rapidly from an initial 245° until the temperature of operation after 8 weeks necessary to give the same yield of product was 264°. In Example 2, however, the temperature of operation of the nitrided catalyst remained fairly constant rising only very slowly during approximately 14 weeks of operation. (See curve 2.)

In addition to a large increase in activity of the catalyst, when nitrided in accordance with the present invention, nitriding of the catalyst also causes a remarkable change in the type of product obtained. As explained above, the use of an iron catalyst in the catalytic hydrogenation of carbon monoxide will produce a mixture of saturated and unsaturated hydrocarbons and oxygenated organic compounds, with the hydrocarbons predominating. On the whole, the entire yield of both hydrocarbons and oxygenated organic compounds, in the example employing the nitrided catalyst, was shifted toward the compounds of lower molecular weight. This is particularly evident in the distillation data wherein it can be seen that the yield of liquid hydrocarbons and oxygenated organic compounds boiling below 185° C. is almost double in the case of the nitrided iron catalyst.

In the infrared analysis of the distillation fractions for hydroxyl, and $\alpha$ and $\beta$ olefins, the change in distribution of the products for the nitrided and unnitrided catalysts is also very remarkable. It will be noted that the nitrided catalyst produces over 10 times as much oxygenated organic compounds in the fraction which boils at a temperature below 185° C. than the unnitrided catalyst, while it produces a much smaller quantity of $\alpha$ and $\beta$ olefins. In the fraction boiling over from 185° to 352°, the nitrided catalyst produces about 20 times as much oxygenated compounds as does the unnitrided catalyst, while here again the production of unsaturates is much lower.

EXAMPLES 3 (A, B, AND C) AND 4 (A, B, AND C)

Substantially the same procedure was followed as in Examples 1 and 2. The synthesis gas consisting of a mixture of carbon monoxide and hydrogen in the ratio of 1:1 was passed over a fixed-bed catalyst at a space velocity of about 100 SVH and at a pressure of 100 lbs./in.$^2$ gage. In order to provide a proper basis for comparison between the nitrided and unnitrided catalyst the percentage contraction of the synthesis gas was kept substantially constant at 65% as in Examples 1 and 2. The catalyst employed was an iron catalyst identical with that employed in Examples 1 and 2 and reduced and nitrided to the extent indicated in Table II below.

*Table II*

| Example | 3A | 3B | 3C | 4A | 4B | 4C |
|---|---|---|---|---|---|---|
| Reduction of catalyst in H$_2$: | | | | | | |
| Temp., °C | 450 | -------- | 385 | 450 | 385 | -------- |
| Hours | 40 | -------- | 4 | 40 | 4 | -------- |
| SVH | 2,500 | -------- | 1,000 | 2,500 | 5,000 | -------- |
| Percent reduction | 96.1 | -------- | -------- | 100.8 | -------- | -------- |
| Nitriding of catalyst in ammonia: | | | | | | |
| Temp., °C | 450 | 385 | -------- | 385 | -------- | 385 |
| Hours | 5 | 4 | -------- | 4 | -------- | 4 |
| SVH | 5,000 | 5,000 | -------- | 5,000 | -------- | 1,000 |
| Atom ratio, N/Fe | 0.032 | 0.440 | 0 | 0.440 | 0 | 0.440 |
| Operating conditions for synthesis: | | | | | | |
| Temp., °C | 240 | 222 | 239 | 225 | 239 | 224 |
| Pressure, p. s. i. g | 100 | 100 | 100 | 100 | 100 | 100 |
| SVH | 97 | 98 | 108 | 98 | 96 | 99 |
| Percent contraction of synthesis gas | 65.3 | 69.5 | 70.8 | 64.1 | 62.9 | 62.6 |
| Weeks of operation during which above operating data was averaged | 2d to 8th | 10th to 12th | 18th to 20th | 2d to 8th | 10th to 11th | 16th to 18th |
| Product composition in percent by weight, overall distribution: | | | | | | |
| CH$_4$ | 13.1 | 29.6 | 14.5 | 20.9 | 11.9 | 25.5 |
| C$_3$ + C$_4$ | 19.3 | 26.2 | 25.7 | 25.3 | 21.0 | 29.4 |
| C$_1$ + C$_2$ + C$_3$ + C$_4$ | 39.5 | 77.2 | 49.2 | 55.4 | 41.8 | 63.3 |
| Liquids and solids | 60.4 | 22.8 | 50.8 | 44.6 | 58.2 | 36.7 |
| Distillation of liquids and solids, percent by weight: | | | | | | |
| B. P., < 185° C | 21.3 | 58.4 | 33.3 | 63.9 | 58.3 | 39.7 |
| B. P., 185-352° C | 38.4 | 35.0 | 37.4 | 32.8 | 33.5 | 31.3 |
| B. P., 352-464° C | 16.5 | 5.1 | 12.6 | 3.2 | 6.8 | 11.8 |
| B. P., > 464° C | 17.8 | 1.5 | 16.7 | 1 | 1.4 | 17.2 |
| Infrared analysis of fractions, percent by weight: | | | | | | |
| B. P., < 185° C. { OH | 1.3 | 9.1 | 1.5 | 7.8 | 1.1 | -------- |
| $\alpha$-olefins | 4.7 | 2.0 | 5.5 | 5.2 | 4.3 | -------- |
| $\beta$-olefins | 4.5 | 1.2 | 2.7 | 0.7 | 4.6 | -------- |
| Bromine No | 61.0 | 21.0 | 55.0 | 3.9 | 59.0 | -------- |
| B. P., 185-352° C. { OH | 0.03 | 0.75 | 0.12 | 1.0 | 0.05 | -------- |
| $\alpha$-olefins | 0.9 | 0.83 | 1.6 | 1.0 | 0.79 | -------- |
| $\beta$-olefins | 3.5 | 1.5 | 2.6 | 1.2 | 3.4 | -------- |
| Bromine No | 20.0 | 16.0 | 28.0 | 15.0 | 28.0 | -------- |

In Examples 3 (A, B, and C) the catalyst was initially nitrided very slightly until the atom ratio of nitrogen to hydrogen was 0.032. This slightly nitrided catalyst was then used in the process for 8 weeks (Example 3A) and the temperature of operation averaged from the 2nd to the 8th week. At the end of the 8th week, the process was discontinued and the catalyst was subjected to further treatment with ammonia gas until the catalyst was more completely nitrided, the atom ratio of nitrogen to iron now being 0.440. The process was then continued with the renitrided catalyst for an additional 8 weeks (Example 3B) the temperature of operation being averaged from the 10th to the 12th week. At the end of the 16th week, the process was again discontinued and the catalyst was reduced in hydrogen in order to remove the nitride. In substantially pure hydrogen at 385° it was only necessary to treat the nitride for four hours in order to remove all of the nitrogen, since the nitride is rapidly reduced in hydrogen at temperatures above 250° C. The process was then continued for several more weeks (Example 3C) and the average temperature between the 18th and 20th week was noted.

In Example 3A wherein the slightly nitrided catalyst was used, it will be noted that the average temperature of operation is approximately 20° below the temperature of operation in Example 1 although the catalyst in Example 3A was only very slightly nitrided. Thus it is seen that even at low atom ratios of nitrogen to iron the activity of the catalyst is improved. This low degree of nitriding, however, seemed to have little effect on the distribution of the products, approximately the same molecular weight distribution being observed.

In Example 3B, wherein the same catalyst used in Example 3A was renitrided more completely after 8 weeks of use, the average temperature dropped to 222° C. This temperature drop is substantially the same as the temperature drop observed in Example 2 wherein the nitrided catalyst operated at a temperature about 40° below the temperature of operation of an unnitrided catalyst under the same conditions. In Example 3B a marked change in the distribution of the products will be noted. As in Example 2 the use of a nitrided catalyst shifts the products towards those of lower molecular weight.

In Example 3C where the catalyst used in Example 3A and 3B was reduced in hydrogen after 16 weeks of operation, it will be noted that the average temperature of operation rose about 20° above the temperature of operation of the fully nitrided catalyst. It is interesting that the temperature did not rise as high as might be expected for an unnitrided catalyst. It is believed that nitriding followed by operation in the synthesis and reduction in hydrogen to remove the nitride has a beneficial effect on the activity of the catalyst perhaps through some rearrangement of the iron lattice, although the distribution of the products does not appear to be materially affected. This method of improving the activity of the catalyst will not be claimed in this application but will be made the subject of a separate application.

Figure 3:
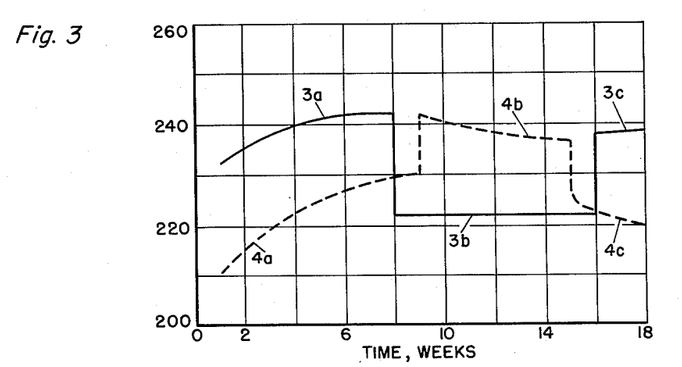

In Fig. 3, the temperature of operation in Examples 3A, B, and C has been plotted against the time of operation in weeks. Curve 3A corresponds to Example 3A and shows the temperatures of operation from the second to the 8th week. At the end of the 8th week, it will be noted that the catalyst was renitrided to increase the ratio of nitrogen to iron. An immediate drop in the operating temperature was noted and the fully nitrided catalyst operated at 222° C. from the 8th to the 16th week. Curve 3B is the plot of the temperature from the 8th to the 16th week. At the end of the 16th week, the nitrogen was removed by treatment of the catalyst with hydrogen gas and the temperature immediately arose to about 239° C. Curve 3C is the plot of the temperature from the 16th to about the 18th week.

In Example 4A, the catalyst was initially nitrided to an atom ratio of nitrogen to iron of 0.440, and the process conducted using this catalyst for 9 weeks, the temperature being averaged from the 2nd to the 8th week. In Example 4B, the catalyst used in Example 4A was reduced in hydrogen after the 9th week of operation and the process continued for an additional 7 weeks, whereupon at the end of the 15th week the same catalyst was subjected to a stream of ammonia gas in order to renitride to an atom ratio of nitrogen to iron of 0.440 and the process continued for several more weeks (Example 4C). In Example 4A, where the catalyst was initially strongly nitrided results comparable to those of Example 2 were obtained, the temperature of operation being 40° lower than the temperature of operation with the unnitrided catalyst and the distribution of the products being quite markedly shifted from the higher towards the lower molecular weight hydrocarbons and with a marked increase in the percentage of oxygenated organic compounds. In Example 4B where the nitrided catalyst was reduced in hydrogen to eliminate the nitride, results comparable to Example 3C were obtained. The temperature of operation was somewhat lower, but the distribution of the products remained about the same as when using the unnitrided catalyst.

In Example 4C renitriding the catalyst which had been used successively in Examples 4A and 4B to an atom ratio of nitrogen to iron of 0.440 restored the catalyst to its original high activity, the average temperature of operation being about 224° C. or about 40° C. lower than the average temperature of operation for the unnitrided catalyst under the same conditions. Redistribution of the products towards those of lower molecular weight was also noted in Example 4C.

In Fig. 3 the temperatures of operation in Example 4A, B, and C, were plotted against time of operation in weeks, curve 4A corresponding to Example 4A, curve 4B to Example 4B, and curve 4C corresponding to Example 4C. It will be observed that the same immediate rise in temperature occurred when the nitride was reduced in hydrogen and that the same sharp drop in temperature occurred when the catalyst was renitrided in ammonia.

EXAMPLES 5 (A AND B) AND 6

In these examples substantially the same procedure was followed as in the examples above with the exception that the operating pressure was raised to 300 lbs./in.² gage. A mixture of hydrogen and carbon monoxide in the ratio of 1:1 was passed over a fixed-bed catalyst at a pressure of 300 lbs./in.² gage and at a space velocity of about 300 SVH and the temperature of operation adjusted so that during the whole operation the percent contraction of synthesis gas remained about 65%. The catalyst used was the same catalyst used in the examples above, being prepared in accordance with Example A.

Table III

| Example | 5A | 5B | 6 |
|---|---|---|---|
| Reduction of catalyst in H₂: | | | |
| Temp., °C | 450 | | 550 |
| Hours | 40 | | 20 |
| SVH | 2,500 | | 2,500 |
| Percent Reduction | 92.6 | | 99.0 |
| Nitriding of catalyst in ammonia: | | | |
| Temp., °C | | 385 | 385 |
| Hours | | 4 | 4 |
| SVH | | 5,000 | 5,000 |
| Atom ratio, N/Fe | 0 | 0.440 | 0.262 |
| Operating conditions for synthesis: | | | |
| Temp., °C | 257 | 243 | 242 |
| Pressure, p. s. i. g | 300 | 300 | 306 |
| SVH | 306 | 295 | 290 |
| Percent Contraction of synthesis gas | 65.5 | 63.0 | 64.0 |
| Weeks of operation during which above operating data was averaged | 2nd to 8th | 13th to 18th | 2nd to 5th |
| Product composition in percent by weight overall distribution: | | | |
| CH₄ | 11.8 | 19.2 | 18.4 |
| C₃+C₄ | 17.2 | 21.8 | 21.1 |
| C₁+C₂+C₃+C₄ | 37.0 | 52.2 | 50.6 |
| Liquids and solids | 63.0 | 47.8 | 49.4 |
| Distillation of liquids and solids, percent by weight: | | | |
| B. P., <185° C | 39.0 | 65.4 | 57.0 |
| B. P., 185-352° C | 29.0 | 24.7 | 31.3 |
| B. P., 352-464° C | 12.6 | 5.7 | 6.5 |
| B. P., >464° C | 19.4 | 4.2 | 3.9 |
| Infrared analysis of fractions, percent by weight: | | | |
| B. P., <185° C — OH | 3.4 | 12.0 | 6.8 |
| B. P., <185° C — α-olefins | 7.0 | 1.6 | 4.3 |
| B. P., <185° C — β-olefins | 0.9 | 0.0 | 0.9 |
| B. P., <185° C — Bromine No | 53.0 | 11.0 | 35.0 |
| B. P., 185-352° C — OH | 0.7 | 2.5 | 1.1 |
| B. P., 185-352° C — α-olefins | 4.0 | 0.6 | 1.1 |
| B. P., 185-352° C — β-olefins | 1.3 | 0.8 | 1.7 |
| B. P., 185-352° C — Bromine No | 35.0 | 9.0 | 19.0 |

In Example 5A, the catalyst was not nitrided initially and the process was conducted with the unnitrided catalyst for about 12 weeks. At the end of this time the process was discontinued and the catalyst was then nitrided in ammonia gas to an atom ratio of nitrogen to hydrogen of 0.440 and the process continued for an additional six weeks (Example 5B). In Example 6 the catalyst was nitrided initially to an atom ratio of nitrogen to iron of 0.262 and the process conducted with this catalyst for about 6 weeks.

Figure 4:
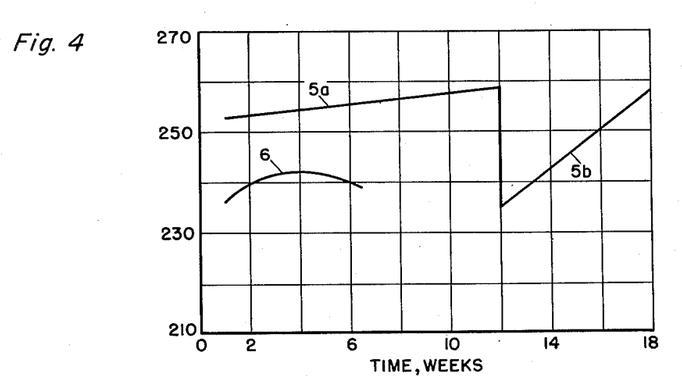

In Fig. 4 the temperatures of operation in Examples 5 (A and B) and 6 have been plotted against the time of operation in weeks. Curve 5A represents the curve developed by the unnitrided catalyst operating at 300 lbs./in.² gage of synthesis gas. After 12 weeks, operation was discontinued and this catalyst was nitrided causing a sharp drop in the temperature of operation after which operation was again commensed and curve 5B was developed. Curve 6 was developed by the catalyst which was nitrided initially as in Example 6. It will be noted that for operation at 300 lbs./in.² gage the catalyst which was nitrided initially appears to operate at a more constant temperature than the catalyst which was nitrided after a period of operation.

Table IV

| Example | 7 | 8 |
|---|---|---|
| Reduction of catalyst in H₂: | | |
| Temp., °C | ᵃ230 | 300 |
| Hours | 24 | 16 |
| SVH | 135 | 1,000 |
| Percent Reduction | | 78.8 |
| Nitriding of catalyst in ammonia: | | |
| Temp., °C | | 300 |
| Hours | | 4 |
| SVH | | 1,000 |
| Atom ratio, N/Fe | 0 | 0.250 |
| Operating conditions for synthesis: | | |
| Temp., °C | 232.3 | 229 |
| Pressure, p. s. i. g | 100 | 100 |
| SVH | 131.7 | 141 |
| Percent contraction of synthesis gas | 64.4 | 63.8 |
| Weeks of operation during which above operating data was averaged | 3rd to 8th | 2nd to 9th |
| Product composition in percent by weight, overall distribution: | | |
| CH₄ | 5.1 | 11.8 |
| C₃+C₄ | 9.3 | 18.6 |
| C₁+C₂+C₃+C₄ | 18.8 | 38.2 |
| Liquids and solids | 81.2 | 61.8 |

ᵃInducted in 1H₂+1CO gas at atmospheric pressure.

EXAMPLES 7 AND 8 (SEE TABLE IV)

In these examples the method of operation was substantially the same as in the above examples with the exception that a different iron catalyst was used. Instead of the fused iron catalyst prepared in accordance with Example A which was used for all of the above examples, a precipitated iron catalyst prepared in accordance with Example B was used. A mixture of carbon monoxide and hydrogen in a ratio of 1:1 were passed over a fixed-bed catalyst at a pressure of 100 lbs./in.² gage and a space velocity of about 100 SVH, and the temperature adjusted from time to time so that during the entire process, the percentage contraction of the synthesis gas was maintained at about 65%. In Example 7, the catalyst was neither reduced nor nitrided. In distinction from the fused catalyst, it is not necessary to specially reduce the precipitated catalyst before use, these catalysts being reduced by the hydrogen and carbon monoxide in the synthesis gas during operation. It is often desirable, however, to induct the precipitated catalyst in a mixture of hydrogen and carbon monoxide and this was done in the case of the catalyst used in Example 7. In Example 8 the catalyst was first reduced in hydrogen and then was nitrided in ammonia to an atom ratio of nitrogen to iron of about 0.250. It will be noted that there was only a small increase in the activity of the nitrided catalyst over the unnitried catalyst, the average temperatures of operation in the case of the nitrided catalyst being slightly lower. However the same shift in the distributing of the products obtained with the use of the nitrided fused iron catalyst occurred when the precipitated nitrided catalyst is used.

It will be apparent from the above examples that nitriding of an iron catalyst markedly increases its activity particularly in the case of the fused iron catalyst. The increase in activity in the case of the precipitated iron catalyst is perceptible, but of a smaller degree. It is believed, although the invention is not to be limited by this theory, that the increase in activity for the fused iron catalyst is due to a modification of the iron lattice. Nitriding of the dense fused iron catalyst appears to have more effect than nitriding of the more porous precipitated iron catalyst. As was pointed out above, this increase in activity permits greater space time yields of product per volume of catalyst employed for a given temperature of operation and also permits lower temperatures of operation to obtain an equivalent space time yield of product. The latter is highly important since the life of the expensive catalyst is greatly extended by employing low temperatures of operation.

Another important characteristic of the nitrided iron catalysts is their long life. One reason for the increased life of the nitrided catalysts is the fact that they resist deposition of free carbon within the catalyst granules. With the ordinary unnitrided catalyst, deposition of free carbon (as distinguished from carbide carbon) soon begins. At lower temperatures of operation deposition of the free carbon does not appear to be very rapid nor does it lower the activity of the catalyst very much. However, gradual accumulation of this free carbon and other degenerative processes, particularly oxidation of the catalyst, gradually cause a loss in activity. To offset this loss in activity, the temperature of operation must be raised. But at higher temperatures, the degenerative processes, particularly deposition of free carbon, are greatly accelerated and the catalyst is quickly rendered unusable. The alternative to raising the temperature of operation as the activity of the catalyst falls off, namely, allowing the space time yield to decrease, is equally undesirable. The deposition of carbon is accompanied by mechanical disintegration of the catalyst. In fixed-bed operation this mechanical disintegration of the catalyst makes the catalyst bed less permeable to the passage of synthesis gas, until finally the catalyst bed is completely plugged. In fluidized bed operation, the disintegration of the catalyst decreases the density of the bed which must be held within close limits in order to prevent excessive entrainment of catalyst particles in the stream of synthesis gas. The nitrided catalyst resists the accumulation of any sizable amount of free carbon. As the operation proceeds, some of the nitride nitrogen is slowly replaced by carbide carbon. Carbide carbon, however, is not detrimental to the catalyst activity nor to its mechanical stability. Analyses made of the nitrided catalyst over a long period of use showed very little free carbon deposition.

Another advantage of the nitrided catalyst is that the catalyst expands (i. e., increases in bulk volume) during nitriding and does not change in volume during use in the synthesis. On the other hand, iron catalysts that have not been nitrided increase in volume during use in the process due to the formation of iron carbides and free carbon. This increase in volume causes the catalyst to jam into the catalyst tube, and makes difficult the removal of the catalyst from fixed bed reactors, even though the catalyst has not disintegrated by carbon deposition.

Another reason for the enhanced durability and longer life of the nitrided catalyst is the fact that it resists oxidation during use. The presence of oxygen in the catalyst lessens the activity of the catalyst since the iron oxide appears to have no catalytic effect in the process. As pointed out above, decrease in activity of the catalyst necessitates increasing the operating temperature to maintain the same space-time yield, and the increased temperature operates to accelerate the degenerative processes leading to the complete breakdown of the catalyst. Analyses of the nitrided catalyst at various intervals during use indicated a negligible amount of oxidation while similar analyses made for the unnitrided catalyst showed a high degree of oxidation.

Although hydrogen alone will very rapidly reduce the nitrides at temperatures above 250° C., it has been found that the hydrogen present in the synthesis gas has no appreciable reducing effect on the nitrided catalyst. Apparently by some mechanism inherent in the process, the reduction is inhibited. It is believed that carbon monoxide in the synthesis gas is responsible for the inhibition.

Another advantage of the nitrided catalyst is its increased versatility. Numerous tests, including the examples above, show that nitriding of the catalyst tends to shift the distribution of the products towards those of lower molecular weight and to increase the fraction of oxygenated compounds. The higher the degree of nitriding, the greater the shift in distribution of products. It will be noted that the slightly nitrided catalyst in Example 3A underwent an increase in activity but the distribution of the products was substantially unaffected. Thus by selecting the proper degree of nitriding a desired product distribution over a wide range may be obtained.

In general, the more complete nitriding of the iron catalyst employed, the greater improvement in its properties, particularly the activity, will be obtained. The lowest atom ratio of nitrogen to iron in which the nitride is present at all is about 0.008, while the highest obtainable atom ratio of nitrogen to iron is about 0.51. Iron catalysts in which the atom ratio of nitrogen to iron is within the limits 0.008 to 0.51 will have improved properties for use in the catalytic hydrogenation of carbon oxides and in particular carbon monoxide. The more important improvement in activity will be obtained in the upper range of atom ratios of nitrogen to iron, from about 0.200 to 0.51. The catalyst may be nitrided at any desired time in the process, but most desirably before use. It may be desirable to renitride the catalyst at intervals during the process since there is a slow loss of nitride nitrogen as the process continues over a long period of time. Renitriding may be done most conveniently without removing the catalyst from the reactor tube.

The use of an iron catalyst in the catalytic hydrogenation of carbon monoxide produces a mixture of saturated and unsaturated hydrocarbons of various molecular weights according to the catalyst employed and other conditions of operation and also a small amount of oxygenated organic compounds. As pointed out, the nitriding of iron catalyst produces the same general type of compounds but shifts the hydrocarbons toward those of lower molecular weight and increases the yield of oxygenated compounds.

The nitrided iron catalyst of the present invention may be used in the range of operating conditions within which iron catalysts have been heretofore used when employed in the catalytic hydrogenation of carbon oxides. Thus when the catalyst is employed in the catalytic hydrogenation of carbon monoxide, mixtures of hydrogen and carbon monoxide may be used wherein the ratio of hydrogen to carbon monoxide is in the range 4:1 to 1:2, and the synthesis gas is passed over the catalyst at pressures of 0 to 450 lbs./in.$^2$ gage, and at temperatures of 150 to 375° C. While the above range of conditions is feasible, it is preferred to operate the process with mixtures of hydrogen and carbon monoxide wherein the ratio of hydrogen to carbon monoxide is in the range of 2:1 to 1:1.5, and wherein the synthesis gas is passed over the catalyst at pressures of 100 to 300 lbs./in.$^2$ gage and at temperatures of 210 to 260° C. Any type of catalyst bed may be employed as desired, including the so-called fixed catalyst bed, externally or internally cooled, or the so-called fluidized bed or any other type of operation known to the art.

It will be understood that the above description and specific examples are for the purpose of explaining and illustrating the invention and it is not intended that the invention be limited thereby, nor in any way, except by the scope of the appended claims.

We claim:

1. The process of catalytically hydrogenating carbon oxides to produce predominantly hydrocarbons containing more than 1 carbon atom in the molecule comprising the step of reacting hydrogen with a carbon oxide in the presence of a catalyst comprising an iron nitride.

2. The process of catalytically hydrogenating carbon monoxide to produce predominantly hydrocarbons containing more than one carbon atom in the molecule comprising the step of reacting hydrogen with carbon monoxide in the presence of a catalyst comprising an iron nitride.

3. The process of catalytically hydrogenating carbon monoxide to produce predominantly hydrocarbon containing more than one carbon atom in the molecule comprising the step of reacting hydrogen with carbon monoxide in the presence of a catalyst comprising an iron nitride in which the atom ratio of nitrogen to iron is within the range of about 0.2 to about 0.510.

4. The process of catalytically hydrogenating carbon monoxide comprising the step of reacting hydrogen with carbon monoxide in the presence of a catalyst comprising as the major constituent thereof an iron nitride.

5. The process of catalytically hydrogenating carbon monoxide comprising the step of reacting hydrogen with carbon monoxide in the presence of a fused catalyst comprising an iron nitride as the major constituent thereof.

6. The process of catalytically hydrogenating carbon monoxide comprising the step of reacting hydrogen with carbon monoxide in the presence of a fused catalyst comprising an iron nitride as the major constituent thereof and containing small quantities of promoters.

7. The process of catalytically hydrogentating carbon monoxide comprising the step of reacting hydrogen with carbon monoxide in the presence of a fused catalyst comprising as the major constituent thereof an iron nitride, and containing a small quantity of an alkali oxide promoter and a small quantity of another metallic oxide other than an alkali oxide.

8. The process of catalytically hydrogenating carbon monoxide to produce predominantly hydrocarbon containing more than one carbon atom in the molecule comprising the step of reacting hydrogen with carbon monoxide in the presence of a catalyst made by reducing an oxide of iron and then nitriding said reduced oxide.

9. The process of catalytically hydrogenating carbon monoxide to produce predominantly hydrocarbons containing more than one carbon atom in the molecule comprising the step of reacting hydrogen with carbon monoxide in the presence of a catalyst made by fusing an iron oxide, reducing said oxide, and then nitriding said reduced oxide in a stream of ammonia gas.

10. The process of catalytically hydrogenating carbon monoxide to produce predominantly hydrocarbons containing more than one carbon atom in the molecule comprising the step of reacting hydrogen with carbon monoxide in the presence of a catalyst prepared by nitriding a fused reduced iron oxide by reacting said fused reduced iron oxide in a stream of substantially pure ammonia gas at a temperature between about 200° to 550° C.

11. The process of catalytically hydrogenating carbon monoxide to produce predominantly hydrocarbons containing more than one carbon atom in the molecule comprising the step of reacting hydrogen with carbon monoxide in the presence of a catalyst prepared by nitriding metallic iron in a stream of ammonia gas until the atom ratio of nitrogen to iron lies about in the range 0.2 to 0.510.

12. The process of catalytically hydrogenating carbon monoxide comprising the step of reacting mixtures of hydrogen and carbon monoxide in which the ratio of hydrogen to carbon monoxide lies within range of 4:1 to 1:2, at a temperature between 150° to 375° C., at a pressure of from 0 to 450 pounds per square inch gage in the presence of a catalyst comprising as the major constituent thereof an iron nitride.

13. The process of catalytically hydrogenating carbon monoxide comprising the step of reacting mixtures of hydrogen and carbon monoxide in which the ratio of hydrogen to carbon monoxide lies within range of 4:1 to 1:2, at a temperature between 150° to 375° C., at a pressure of from 0 to 450 pounds per square inch gage in the presence of a fused catalyst comprising an iron nitride as the major constituent thereof and containing small quantities of promoters.

14. The process of catalytically hydrogenating carbon monoxide comprising the step of contacting a mixture of hydrogen and carbon monoxide in which the ratio of hydrogen to carbon monoxide lies in the range of 2:1 to 1:1.5, at a temperature of 210 to 260° C., and at a pressure of 100 to 300 lbs./in.$^2$ gage, with a catalyst comprising as the major constituent thereof an iron nitride.

15. The process of catalytically hydrogenating carbon monoxide comprising the step of contacting a mixture of hydrogen and carbon monoxide in which the ratio of hydrogen to carbon monoxide lies in the range of 2:1 to 1:1.5, at a temperature of 210 to 260° C., and at a pressure of 100 to 300 lbs./in.$^2$ gage, with a catalyst comprising as the major constituent thereof an iron nitride in which the atom ratio of nitrogen to iron is within the range of about 0.008 to about 0.510 and containing small quantities of promoters.

ROBERT B. ANDERSON.
JOHN F. SHULTZ.

REFERENCES CITED

The following references are of record in the file of this patent:

UNITED STATES PATENTS

| Number | Name | Date |
|---|---|---|
| 1,909,442 | Williams | May 16, 1933 |
| 2,494,561 | Kemp, Jr. | Jan. 17, 1950 |
| 2,531,420 | Frankenburg | Nov. 28, 1950 |

OTHER REFERENCES

Synthetic Liquid Fuels, Annual Report of the Sec. of the Interior for 1949, Part I, Oil from Coal, Feb. 1950, Bureau of Mines Report of Investigations 4651, pp. 31, 32.

Thorpe's Dictionary of Applied Chemistry, p. 334.

Mellor, Comprehensive Treatise on Inorganic and Theoretical Chemistry, vol. 8, p. 133.